US008345035B2

(12) United States Patent
Li et al.

(10) Patent No.: US 8,345,035 B2
(45) Date of Patent: Jan. 1, 2013

(54) LIQUID CRYSTAL DISPLAY AND DISPLAY APPARATUS

(75) Inventors: Wen-Wen Li, Shenzhen (CN); Shih-Wei Chen, Chu-Nan (TW); Ying-Xiang Cheng, Shenzhen (CN)

(73) Assignees: Innocom Technology (Shenzhen) Co., Ltd., Shenzhen (CN); Chimei Innolux Corporation, Miao-Li County (TW)

( * ) Notice: Subject to any disclaimer, the term of this patent is extended or adjusted under 35 U.S.C. 154(b) by 523 days.

(21) Appl. No.: 12/619,770

(22) Filed: Nov. 17, 2009

(65) Prior Publication Data

US 2010/0141632 A1 Jun. 10, 2010

(30) Foreign Application Priority Data

Dec. 10, 2008 (CN) .......................... 2008 1 0306068

(51) Int. Cl.
*G06F 3/038* (2006.01)

(52) U.S. Cl. ....................................................... 345/212

(58) Field of Classification Search ........................ None
See application file for complete search history.

(56) References Cited

U.S. PATENT DOCUMENTS

| | | | | |
|---|---|---|---|---|
| 5,917,716 | A | 6/1999 | Cho | |
| 7,196,701 | B2 * | 3/2007 | Tsutsui et al. | 345/211 |
| 7,420,553 | B2 * | 9/2008 | Tseng et al. | 345/213 |
| 7,875,998 | B2 * | 1/2011 | Ting | 307/140 |
| 2006/0099994 | A1 | 5/2006 | Yang et al. | |

FOREIGN PATENT DOCUMENTS

| | | | |
|---|---|---|---|
| CN | 2497357 | Y | 6/2002 |
| CN | 2531438 | Y | 1/2003 |
| CN | 1484137 | A | 3/2004 |
| CN | 201114445 | Y | 9/2008 |

* cited by examiner

*Primary Examiner* — Jason Olson
(74) *Attorney, Agent, or Firm* — WPAT PC; Justin King

(57) ABSTRACT

A liquid crystal display includes a liquid crystal panel switchable between normal mode for displaying images and standby mode, a control circuit coupled to the liquid crystal panel controlling the liquid crystal panel mode according to video signals transmitted thereto, and a power board providing a power voltage to the control circuit. When the liquid crystal panel is in a standby mode, the control circuit outputs a corresponding feedback signal to interrupt power voltage supply from the power board to the control circuit.

14 Claims, 4 Drawing Sheets

LIQUID CRYSTAL DISPLAY AND DISPLAY APPARATUS

BACKGROUND

1. Technical Field

The present disclosure relates to a display apparatus such as a liquid crystal display (LCD), and especially to power management in a display apparatus and LCD.

2. Description of Related Art

LCDs are widely used in various information products such as notebooks, personal digital assistants (PDAs), video cameras, and the like. FIG. 4 is a block diagram of one such LCD 100. The LCD 100 includes a power board 11, a control circuit 12, and a liquid crystal panel 13. The power board 11 is electrically coupled to the control circuit 12, providing operating power to the control circuit 12. The control circuit 12 is electrically coupled between the liquid crystal panel 13 and an external video source 14 such as a computer host providing video signals thereto, and controls a working mode of the liquid crystal panel 13 according to output of the video source 14.

In operation, the control circuit 12 converts video signals output by the video source 14 into corresponding driving voltages, and provides the driving voltages to the liquid crystal panel 13. Thereby, the liquid crystal panel 13 is directed in a normal mode, displaying images corresponding to the video signals. Upon detecting that no video signal has been output by the video source 14 within a predetermined time period, the control circuit 12 switches the liquid crystal panel 13 from the normal mode to a standby mode, so as to conserve power consumed by the liquid crystal panel 13.

In standby mode, no image is displayed, and accordingly overall power consumption of the LCD 100 is minimal. In the described LCD 100, however, the power board 11 continues to provide power voltage to the control circuit 12 even when the liquid crystal panel 13 is in standby mode, consuming un-needed power.

What is needed, therefore, is an LCD and a display apparatus that can overcome the described limitations.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe certain exemplary embodiments of the present disclosure in detail.

Figure 1:
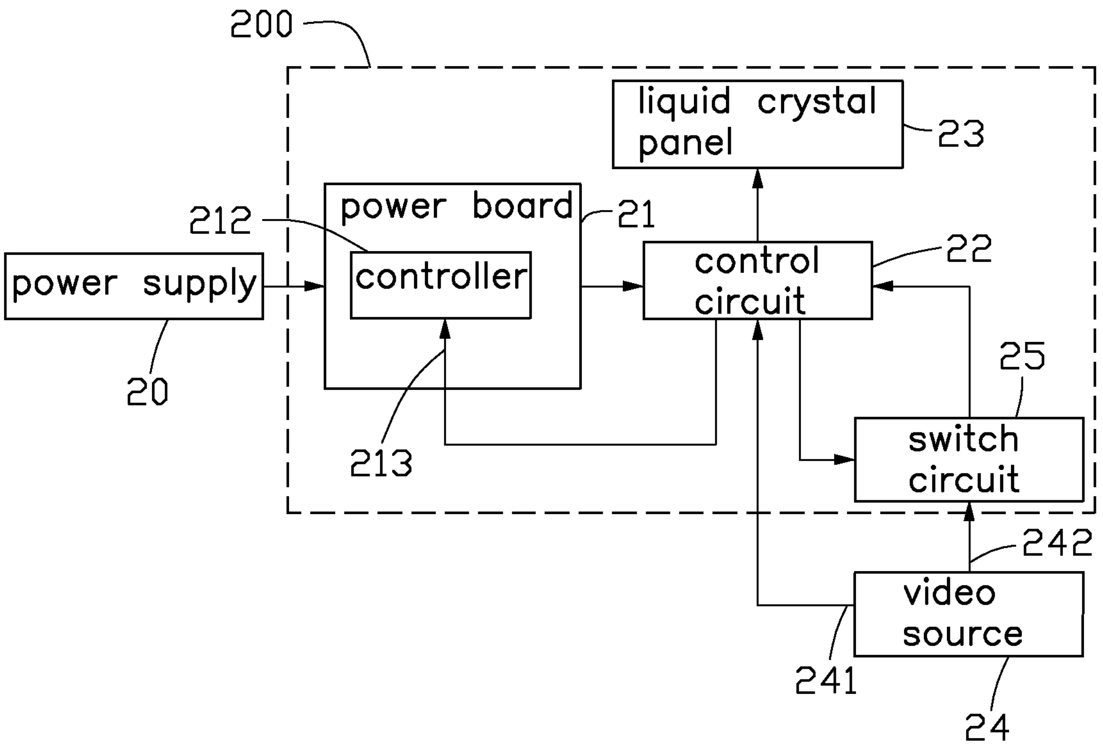
FIG. 1 is a block diagram of an LCD according to one embodiment of the present disclosure, the LCD including a switch circuit.
Figure 2:
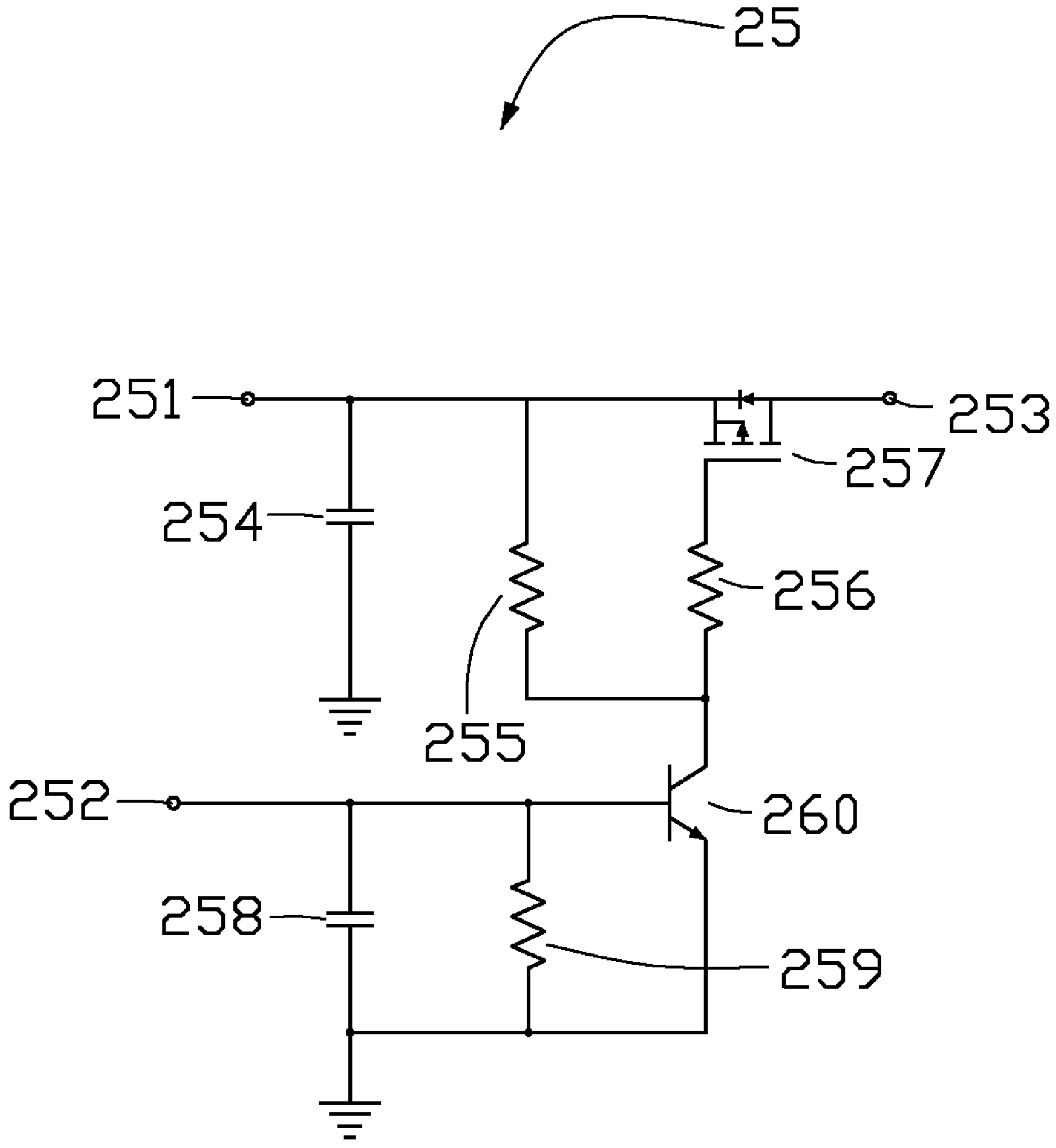
FIG. 2 is a diagram of one embodiment of the switch circuit of the LCD of FIG. 1.

FIG. 1 is a block diagram of an LCD 200 according to one embodiment of the present disclosure. The LCD 200 includes a power board 21, a control circuit 12, a liquid crystal panel 23, and a switch circuit 25.

The power board 21 is electrically coupled between a power supply 20 and the control circuit 22. The power board 21 serves as a power module, and is adapted to receive a power voltage from the power supply 20 and apply the power voltage to the control circuit 22. The power supply 20 may provide an alternate circuit (AC) power voltage, and thus, the power board 21 may be required to convert the AC power voltage into direct current (DC) power voltage, and output the DC power voltage to the control circuit 22, providing operating power thereto.

The power board 21 may include a controller 212 therein with a feedback terminal 213. The controller 212 is configured to direct the power board 21 to continue or stop providing the DC voltage to the control circuit 22 according to a feedback signal received at the feedback terminal 213. In particular, the feedback signal can be provided by the control circuit 22.

The control circuit 22 is electrically coupled between the liquid crystal panel 23 and an external video source 24, and is adapted to control a working mode of the liquid crystal panel 23 according to video signals transmitted thereto, that is, according to a signal output of the video source 24. In addition, the control circuit 22 can further provide a control signal to the switch circuit 25, as well as provide the feedback signal to the power board 31, both of the control signal and the feedback signal can be generated based on the working mode of the liquid crystal panel 23.

The video source 24 can be a computer host or a video player configured for providing video signals. The video source 24 may include a first output terminal 241 for outputting the video signals, and a second output terminal 242 for outputting an auxiliary power voltage. The first output terminal 241 may be directly coupled to the control circuit 22, and the second output terminal may be electrically coupled to the control circuit 22 via the switch circuit 25.

The switch circuit 25 is electrically coupled between the control circuit 22 and the video source 24. The switch circuit 25 may function in switched-on or switched-off state, the respective working state controlled by the control signal output by the control circuit 22. Moreover, when switched on, the switch circuit 25 can provide a path for auxiliary power voltage from the second output terminal 242 of the video source 24 to the control circuit 22. When switched off, the switch circuit 25 interrupts the path of the auxiliary power voltage.

Figure 3:
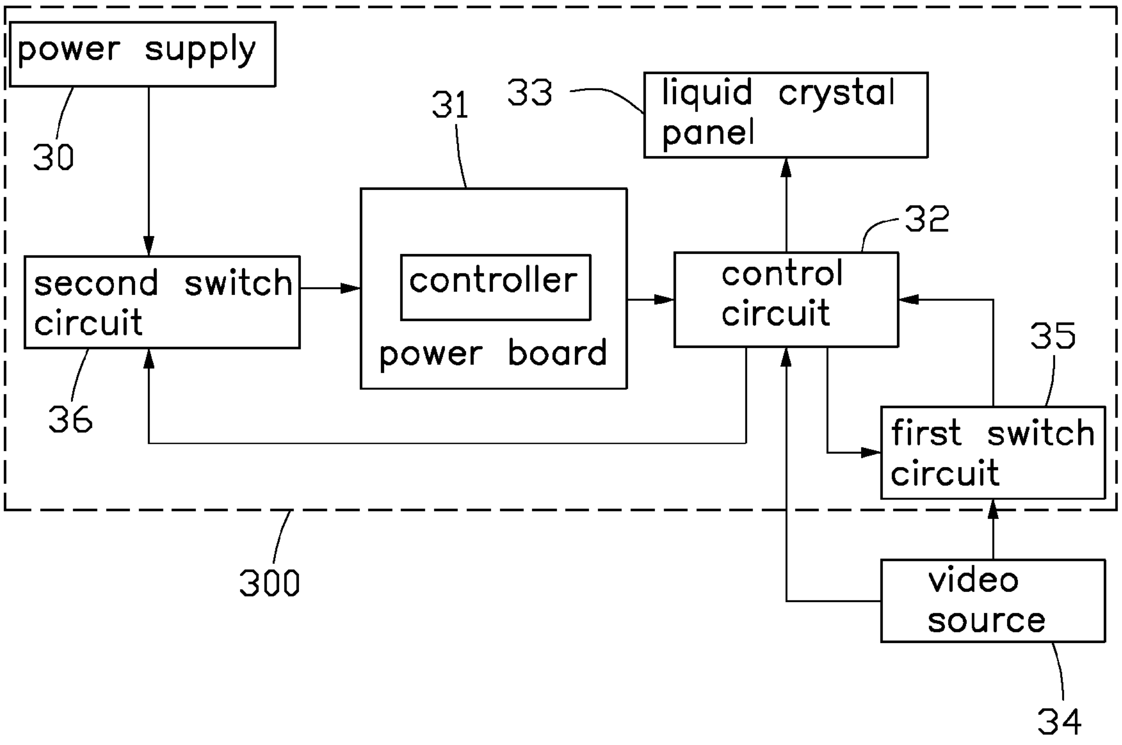
FIG. 3 is a block diagram of a display apparatus according to another embodiment of the present disclosure.
Figure 4:
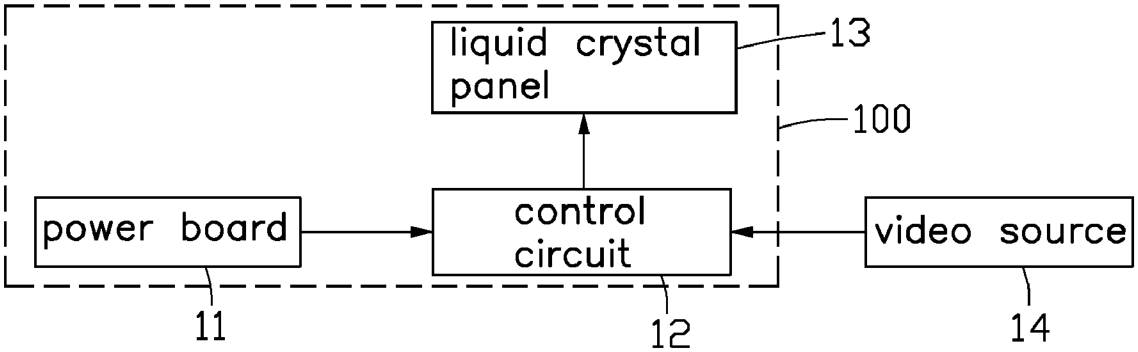
FIG. 4 (RELATED ART)
FIG. 4 is a block diagram of a frequently used LCD.

Referring to FIG. 3, the switch circuit 25 includes a first input terminal 251, a second input terminal 252, an output terminal 253, a first filter capacitor 254, a first bias resistor 255, a voltage-dividing resistor 256, a first transistor 257, a second filter capacitor 258, a second bias resistor 259, and a second transistor 260. In the illustrated embodiment, the first transistor 257 and the second transistor 260 can respectively be a p-type metal-oxide-semiconductor field effect transistor (P-MOSFET) and a npn bipolar junction transistor (npn BJT).

The first input terminal 251 is configured to receive the auxiliary power voltage from the video source 24. The second input terminal 252 is configured to receive the control signal from the control circuit 22. A source electrode of the first transistor 257 is electrically coupled to the first input terminal 251, and is grounded via the first filter capacitor 254. A drain electrode of the first transistor 257 is electrically coupled to the output terminal 253. A gate electrode of the first transistor 257 is electrically coupled to a collection electrode of the second transistor 260 via the voltage-dividing resistor 256. A base electrode of the second transistor 260 is electrically coupled to the second input terminal 252, and is grounded via the second filter capacitor 258. An emitter electrode of the second transistor 260 is grounded directly. In addition, the first bias resistor 255 is electrically coupled between the source electrode of the first transistor 257 and the collection electrode of the second transistor 260, and the second bias resistor 259 is electrically coupled between the base electrode and the emitter electrode of the second transistor 260.

In operation, the control circuit 22 receives a DC power voltage and video signals from the power board 21 and the video source 24 respectively. The DC power voltage enables the control circuit 22 to convert the received video signals into corresponding driving voltages, and then output the driving voltages to the liquid crystal panel 23. As such, the liquid crystal panel 23 functions in normal mode, displaying images in accordance with the driving voltages. Moreover, the control circuit 22 also provides a control signal with a low voltage, which indicates the liquid crystal panel 23 is in the normal mode, to the second input terminal 252 of the switch circuit 25, such that the first transistor 257 and the second transistor 260 are both turned off. Thus, a path between the first input terminal 251 and the output terminal 253 thereof is cut off, and the switch circuit 25 is switched off. In this circumstance, the auxiliary power voltage received by the first input terminal 251 of the switch circuit 25 is prevented from reaching the control circuit 22.

If no video signal has been output from the video source 24 within a predetermined time period, the control circuit 22 switches the liquid crystal panel 23 into standby mode. Moreover, the control circuit 22 provides a control signal with a high voltage, which indicates the liquid crystal panel 23 is in the standby mode, to the switch circuit 25 via the first input terminal 252. Control circuit 22 also provides a feedback signal corresponding to the standby mode of the liquid crystal panel 23 to the controller 212 of the power board 21 via the feedback terminal.

Upon receiving the feedback signal, the controller 212 directs the power board 21 to stop DC power voltage to the control circuit 22. Due to the control signal being at high voltage, in the switch circuit 25, the second transistor 260 is turned on, and thereby the gate electrode of the first transistor 257 is grounded via the resistor 256. Accordingly, the first transistor 257 is turned on. Thus, the switch circuit 25 is switched on, and a path between the first input terminal 251 and the output terminal 253 thereof is introduced. In this circumstance, the auxiliary power voltage received by the first input terminal 251 is output to the control circuit 22 via the switch circuit 25. Due to the auxiliary power voltage, the control circuit 22, receiving no DC power voltage, is enabled to maintain the liquid crystal panel 23 in standby mode.

As can be seen, with the described configuration, the power board 21 stops power to the control circuit 22 when the liquid crystal panel 23 is in standby mode, and rather, the auxiliary power voltage from the video source 24 is adopted to maintain the function of the control circuit 22. It is noted that the auxiliary power voltage from the video source 24 is usually very low, and therefore power conservation in the LCD 200 is promoted.

It is noted that the disclosure in the above embodiment may alternatively be applied in other kind of display apparatus, such as a plasma display panel (PDP), an OLED display panel, or the like.

FIG. 3 is a block diagram of a display apparatus 300 according to another embodiment of the present disclosure. The display apparatus 300 may be an LCD, which differs from LCD 200 in that another switch circuit 36 is employed therein to control AC power voltage provided by a power supply 30 to a power board 31 of the display apparatus 300 according to a feedback signal output by a control circuit 32. To distinguish a switch circuit 35 (namely, a first switch circuit 35) between a video source 34 and the control circuit 35, the newly employed switch circuit 36 in the display apparatus 300 is named as a second switch circuit 36 hereinafter.

Specifically, the second switch circuit 36 is electrically coupled between the power supply 30 and the power board 31, and further electrically coupled to the control circuit 32 of the LCD 300 for receiving the feedback signal from the control circuit 32. The second switch circuit 36 may include a relay, adapted to interrupt supply between the power supply 30 and the power board 31 upon receiving a feedback signal indicating that a liquid crystal panel 33 of the LCD 300 is in standby mode.

In operation, when no video signal has been output from the video source 34 within a predetermined time period, the control circuit 32 switches the liquid crystal panel 33 to standby. Additionally, the control circuit 32 also provides a corresponding feedback signal to the second switch circuit 36. Upon receiving the feedback signal, the second switch circuit 36 interrupts the power supply 30 to the power board 31, such that no power is provided thereto.

In the described configuration, receiving no AC power voltage, the power board 31 stops functioning completely when the liquid crystal panel 33 is in standby mode, reducing overall power consumption of the LCD 300.

It is to be understood, however, that even though numerous characteristics and advantages of the present embodiments have been set out in the foregoing description, together with details of the structures and functions of the embodiments, the invention is illustrative only; and that changes may be made in detail, especially in matters of arrangement of parts within the principles of the invention to the full extent indicated by the broad general meaning of the terms in which the appended claims are expressed.

What is claimed is:

1. A liquid crystal display, comprising:

a liquid crystal panel adapted to be switchable between a normal mode for displaying images and a standby mode;

a control circuit electrically coupled to the liquid crystal panel configured for switching the liquid crystal panel between the normal mode and the standby mode according to video signals transmitted thereto, and switching the liquid crystal panel to the standby mode when no video signal has been output to the control circuit from an external video source within a predetermined time period;

a power board configured for providing a power voltage to the control circuit; and a first switch circuit configured to receive an auxiliary power voltage from the video source, and output the auxiliary power voltage to the control circuit when receiving a control signal indicating that the liquid crystal panel is in the standby mode from the control circuit;

wherein when the liquid crystal panel is in the standby mode, the control circuit outputs a corresponding feedback signal to stop the power board from providing the power voltage to the control circuit.

2. The liquid crystal display of claim 1, wherein the first switch circuit is further configured to prevent output of the auxiliary power voltage to the control circuit when receiving a control signal indicating that the liquid crystal panel is in the normal mode from the control circuit.

3. The liquid crystal display of claim 1, wherein the first switch circuit comprises a first input terminal for receiving the auxiliary power voltage, a second input terminal for receiving the control signal, a first transistor, and a second transistor; wherein a source electrode of the first transistor is electrically coupled to the first input terminal, a drain electrode of the first transistor is electrically coupled to an output terminal of the first switch circuit, a gate electrode of the first transistor is electrically coupled to a collection electrode of the second transistor, a base electrode of the second transistor is electrically coupled to the second input terminal, and an emitter electrode of the second transistor is grounded.

4. The liquid crystal display of claim 3, wherein the first switch circuit comprises a first resistor and a second resistor, the first resistor electrically coupled between the source electrode of the first transistor and the collection electrode of the second transistor, and the second resistor electrically coupled between the base electrode and the emitter electrode of the second transistor.

5. The liquid crystal display of claim 1, wherein the power board comprises a controller with a feedback terminal, the feedback signal output to the controller via the feedback terminal, and the controller is configured to control an output of the power board according to the received feedback signal.

6. The liquid crystal display of claim 1, further comprising a second switch circuit to which the feedback signal is output, configured to control power voltage supply to the power board.

7. The liquid crystal display of claim 6, wherein the second switch circuit cuts off a power supply to the power board according to the received feedback signal.

8. A display apparatus, comprising:

a display module configured for displaying images;

a control circuit configured for controlling a working mode of the display module;

a power module configured for providing a power voltage to the control circuit; and a switch circuit configured to receive an auxiliary power voltage from an external video source, and output the auxiliary power voltage to the control circuit when receiving a control signal corresponding to the standby mode of the display module from the control circuit;

wherein when no video signal has been transmitted to the control circuit within a predetermined time period, the control circuit switches the display module to a standby mode and outputs a corresponding feedback signal to stop power voltage supply from the power module to the control circuit.

9. The display apparatus of claim 8, wherein the switch circuit is further configured to stop auxiliary power output to the control circuit when receiving a control signal corresponding to a normal mode of the display module from the control circuit.

10. The display apparatus of claim 8, wherein the power board comprises a controller configured to control power voltage output from the power module according to the received feedback signal.

11. A display apparatus, comprising:

a display module configured for displaying images;

a control circuit configured for controlling a working mode of the display module;

a power circuit configured for providing a power voltage to the control circuit based on an AC power voltage; and a first switch circuit configured to receive an auxiliary power voltage from the video source and output the auxiliary power voltage to the control circuit when receives a control signal corresponding to the standby mode of the display module from the control circuit;

wherein when no video signal is transmitted to the control circuit within a predetermined time period, the control circuit switches the display module to a standby mode, and outputs a corresponding feedback signal to stop the power circuit from providing power voltage to the control circuit.

12. The display apparatus of claim 11, wherein the first switch circuit is further configured to stop auxiliary power voltage to the control circuit when receiving a control signal corresponding to a normal mode of the display module from the control circuit.

13. The display apparatus of claim 11, wherein the power board comprises a controller configured to control power voltage from the power circuit according to the received feedback signal.

14. The display apparatus of claim 11, further comprising a second switch circuit configured to interrupt the power supply to the power circuit when receiving the feedback signal.

* * * * *